US008428635B2

(12) United States Patent
Watson et al.

(10) Patent No.: US 8,428,635 B2
(45) Date of Patent: *Apr. 23, 2013

(54) SYSTEM AND METHOD FOR MANAGING GROUP COMMUNICATIONS

(75) Inventors: Scott Watson, Marina Del Rey, CA (US); Armando Santana, Glendale, CA (US); Orrin J. Shively, Glendale, CA (US); Robert Swirsky, Sunnyvale, CA (US); Jonathan Gilbert, San Francisco, CA (US); Ben Brown, Austin, TX (US)

(73) Assignee: Disney Enterprises, Inc., Burbank, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/313,231

(22) Filed: Nov. 17, 2008

(65) Prior Publication Data
US 2009/0233639 A1    Sep. 17, 2009

Related U.S. Application Data

(60) Provisional application No. 61/069,116, filed on Mar. 11, 2008.

(51) Int. Cl.
| | |
|---|---|
| H04H 40/00 | (2008.01) |
| H04H 20/71 | (2008.01) |
| H04L 29/06 | (2006.01) |
| H04M 1/00 | (2006.01) |
| H04M 3/00 | (2006.01) |
| H04W 24/00 | (2009.01) |
| H04W 4/00 | (2009.01) |

(52) U.S. Cl.
USPC ........... 455/519; 455/563; 455/517; 455/518; 455/411; 725/53; 370/338

(58) Field of Classification Search ............. 455/456.03, 455/3.06, 6.01, 466, 3.01, 517–519, 563, 455/411, 414.3, 550.1, 418, 456.3; 370/338; 725/53
See application file for complete search history.

(56) References Cited

U.S. PATENT DOCUMENTS

| | | | |
|---|---|---|---|
| 6,671,807 B1 | 12/2003 | Jaisimha | |
| 7,251,495 B2 | 7/2007 | Keyani | |
| 7,409,221 B2 * | 8/2008 | Obradovich et al. | ......... 455/457 |
| 7,412,042 B2 | 8/2008 | Henry | |
| 7,505,779 B1 | 3/2009 | David | |

(Continued)

OTHER PUBLICATIONS

"Twitter: What are you doing?" 2008 *Twitter*. Jan. 6, 2009 <http://twitter.com/>.

(Continued)

*Primary Examiner* — Bobbak Safaipour
(74) *Attorney, Agent, or Firm* — Farjami & Farjami LLP

(57) ABSTRACT

Provided is a system for managing group communications. The system comprises a communications server accessible by a group of users having a first mobile communication device and a second mobile communication device; a local services network interactively connected to the communications server; a group management application resident on the communications server, the group management application configured to activate a group communication session corresponding to an identification code assigned to the group, to support communications among the first mobile communication device, the second mobile communication device, and the local services network during the group session, and to terminate the group session after a predetermined time interval; the system designed to manage and distribute communications across the members of the group during the group communication session.

20 Claims, 4 Drawing Sheets

U.S. PATENT DOCUMENTS

| | | | |
|---|---|---|---|
| 7,509,124 B2* | 3/2009 | O'Neil | 455/432.2 |
| 7,689,510 B2 | 3/2010 | Lamkin | |
| 7,779,097 B2 | 8/2010 | Lamkin | |
| 7,801,537 B2* | 9/2010 | Matsumoto et al. | 455/456.3 |
| 8,005,460 B2* | 8/2011 | Chen et al. | 455/411 |
| 8,249,504 B2* | 8/2012 | Fujii | 455/41.2 |
| 2001/0054101 A1 | 12/2001 | Wilson | |
| 2002/0068573 A1 | 6/2002 | Raverdy | |
| 2002/0069419 A1 | 6/2002 | Raverdy | |
| 2002/0082897 A1 | 6/2002 | Menelly | |
| 2002/0174003 A1 | 11/2002 | Redmann | |
| 2003/0083889 A1 | 5/2003 | Macklin | |
| 2003/0172090 A1 | 9/2003 | Asunmaa | |
| 2003/0185232 A1 | 10/2003 | Moore | |
| 2003/0191946 A1* | 10/2003 | Auer et al. | 713/182 |
| 2004/0019513 A1 | 1/2004 | Colalancia | |
| 2004/0022227 A1 | 2/2004 | Lynch | |
| 2004/0078341 A1 | 4/2004 | Steichen | |
| 2004/0116115 A1 | 6/2004 | Ertel | |
| 2004/0158482 A1 | 8/2004 | Hale | |
| 2004/0172315 A1 | 9/2004 | Hale | |
| 2004/0172316 A1 | 9/2004 | Hale | |
| 2004/0181424 A1 | 9/2004 | Hale | |
| 2004/0184593 A1 | 9/2004 | Elsey | |
| 2004/0214600 A1 | 10/2004 | Schechet | |
| 2004/0266408 A1 | 12/2004 | Maes | |
| 2005/0044224 A1 | 2/2005 | Jun | |
| 2005/0060173 A1 | 3/2005 | Hale | |
| 2005/0144642 A1 | 6/2005 | Ratterman | |
| 2005/0202830 A1* | 9/2005 | Sudit | 455/456.1 |
| 2005/0240970 A1 | 10/2005 | Schwalb | |
| 2006/0008256 A1 | 1/2006 | Khedouri | |
| 2006/0159109 A1 | 7/2006 | Lamkin | |
| 2006/0189337 A1* | 8/2006 | Farrill et al. | 455/518 |
| 2007/0032247 A1 | 2/2007 | Shaffer | |
| 2007/0038476 A1 | 2/2007 | Sternlicht | |
| 2007/0136573 A1* | 6/2007 | Steinberg | 713/155 |
| 2007/0161402 A1 | 7/2007 | Ng | |
| 2007/0203763 A1 | 8/2007 | Ackley | |
| 2007/0208664 A1 | 9/2007 | Ortega | |
| 2007/0288486 A1 | 12/2007 | Sugihara | |
| 2008/0189293 A1 | 8/2008 | Strandel | |
| 2008/0248781 A1 | 10/2008 | Cedo | |
| 2008/0319935 A1 | 12/2008 | Chandak | |
| 2009/0061835 A1 | 3/2009 | Schmidt | |
| 2009/0100480 A1 | 4/2009 | McQuaide | |
| 2009/0156181 A1 | 6/2009 | Athsani | |
| 2009/0163177 A1 | 6/2009 | Bearden | |
| 2009/0204905 A1 | 8/2009 | Toghia | |
| 2009/0215469 A1* | 8/2009 | Fisher et al. | 455/456.3 |
| 2009/0233543 A1 | 9/2009 | Watson | |
| 2009/0313479 A1* | 12/2009 | Schroter | 713/185 |
| 2010/0063866 A1* | 3/2010 | Kinoshita et al. | 705/10 |
| 2010/0080163 A1* | 4/2010 | Krishnamoorthi et al. | 370/312 |
| 2010/0093373 A1* | 4/2010 | Olsson et al. | 455/456.3 |
| 2010/0144328 A1* | 6/2010 | Keating et al. | 455/414.3 |

OTHER PUBLICATIONS

"Jaiku | Your Conversation." *2008 Jaika*. Jan. 6, 2009 <http://jaiku.com/>.

Acohido, Byron, *Google's GPhone strategy could keep user costs low*, USATODAY.com., (Oct. 14, 2007).

"3jam SuperTest::Your Free Text Messaging Inbox on the Web." *2009 3jam, Inc.*. Jan. 6, 2009 <http://www.3jam.com/>.

"Your Social Compass." *2009 Loopt, Inc*. Jan. 6, 2009 <http://www.loopt.com/>.

"dodgeball.com :: mobile social software." *2009 Google Inc*. Jan. 6, 2009 <http://www.dodgeball.com>.

"Disney Files Patent for Wireless FastPasses." NETCOT.com. posted Sep. 5, 2007 <http://www.netcot.com/thesite/2007/09/05/disney-files-patent-for-wireless-fastpasses/>.

U.S. Appl. No. 12/313,228 Non-Final OA dated Mar. 28, 2011.

U.S. Appl. No. 12/313,228 Resp. to Non-Final OA (As Filed on May 25, 2011).

U.S. Appl. No. 12/313,229 Non-Final OA dated Sep. 22, 2010.

U.S. Appl. No. 12/313,229 Resp. to Non-Final OA (As Filed Dec. 22, 2010).

U.S. Appl. No. 12/313,229 Final OA dated Mar. 14, 2011.

U.S. Appl. No. 12/313,229 RCE and Resp. to Final OA (As Filed on Jun. 13, 2011).

U.S. Appl. No. 12/313,229 Non-Final OA dated Aug. 4, 2011.

U.S. Appl. No. 12/313,227 Non-Final OA dated Mar. 31, 2011.

U.S. Appl. No. 12/313,227 Resp. to Non-Final OA (As Filed Jun. 30, 2011).

* cited by examiner

SYSTEM AND METHOD FOR MANAGING GROUP COMMUNICATIONS

RELATED APPLICATIONS

This application claims priority to U.S. Provisional Application No. 61/069,116, filed on Mar. 11, 2008, which is hereby incorporated by reference in its entirety.

BACKGROUND OF THE INVENTION

1. Field of the Invention

The present invention relates generally to network communications. More particularly, the present invention relates to network management of group communications.

2. Background Art

Wide availability, competitive pricing, and almost comprehensive service coverage have made mobile communication devices such as cellular telephones standard equipment for many people. By freeing individual users from the physical constraints of a wired connection and enabling wireless communication that is largely independent of location, these mobile communication devices have done much to enhance personal communication freedom. However, although these popular mobile devices and the communication networks that support them have been empowering of one-to-one interpersonal communications, they have not been optimized to enhance group communications to nearly the same degree. Thus, while it is easier than ever to exchange information with a single communication partner, there are still substantial inconveniences associated with coordinating communications among a group of users.

For example, consider a nominal group of three mobile communication device users, perhaps friends seeking to get the most enjoyment possible from a group outing by mixing individual and joint activities at a large public recreational venue such as a park or fairground. Let us further assume that each friend has available a conventional cellular telephone supporting typical voice band services in the form of caller voice communications and short message service (SMS) text messaging. Unless the three friends remain together throughout their visit to the recreational venue, there will be instances in which one friend may wish to communicate with both of the other members of the group, who also may not be together.

In order to accomplish the group communication by voice calling under these circumstances, the first friend would be required to call each of the other two friends separately. The obstacles this presents to cooperative group activity are fairly obvious. As a simple example, consider that the first friend desires to organize a group lunch interval at the public venue, and calls the second friend to set a time for meeting at a previously agreed upon dining location. The first and second friends agree to meet in thirty minutes. The first friend then calls the third friend to share the plans, only to be informed that the third friend is halfway through a long line for a very popular ride and won't be free for at least an hour. Agreeing with the third friend that the luncheon should take place in one hour, the first friend must now call the second friend a second time, to update the luncheon schedule. This approach to coordinating group activity has evident drawbacks flowing from the inability of all three friends to communicate together at once.

Alternatively, the first friend could utilize SMS text messaging by sending a single message to both other friends concurrently, thereby initiating a chain of group member exchanged text messages in an attempt to arrive at a consensus. Although this approach to using conventional mobile communication device capabilities may at first seem advantageous, it too has significant drawbacks. For one thing, this approach may be costly to each friend individually. Text messages, like cellular voice calls, are typically billed when sent or received. Thus, the first friend may incur duplicate text messaging charges for the first message sent to two friends, and additional charges for receiving their individual responses. Additional iterations of this group exchange will simply add to the costs. Similarly, the second and third friends may each incur a single billing cost for receiving the originating message, and duplicate costs for issuing a group response. Clearly, this disadvantage becomes even more serious for a larger group.

Furthermore, whether the group of friends elects to exchange individual voice communications or joint text messages, logistical information relative to their common outing is typically limited to whatever any individual friend discovers about local conditions and passes on to the others. Consequently, one or more members of the group may encounter unnecessary frustrations in enjoying the entertainment resources provided by the public venue due to absent or incomplete information regarding their availability, changes to scheduling, or present wait times.

As a result of the various described disadvantages associated with coordinating group communications using conventional mobile communication devices in conventional ways, the recreational experience shared by the group may be less enjoyable than it might have been had group communication been easier and/or more efficient. Moreover, the recreational outing may prove to be a less rich and fulfilling activity than it might have been had the group been able to conveniently access and share venue specific logistical information.

Accordingly, there is a need to overcome the drawbacks and deficiencies in the art by providing a solution for managing group communications that also facilitates group access to additional logistical information relevant to group activities.

SUMMARY OF THE INVENTION

A system and method for managing group communications, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
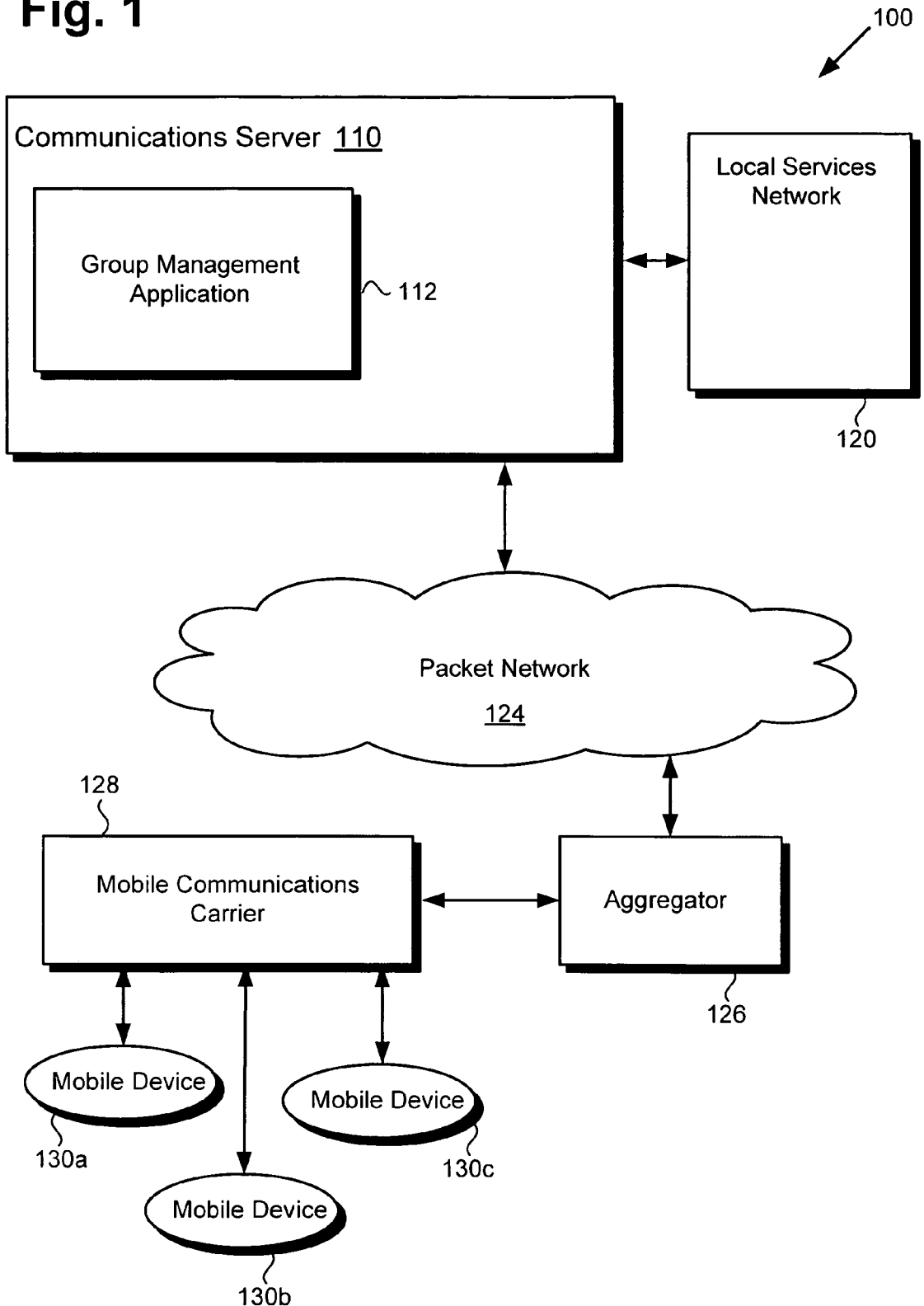
FIG. 1 is a block diagram of a system for managing group communications, according to one embodiment of the present invention.

The present application is directed to a system and method for managing group communications. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a block diagram of communication system 100 for managing group communications, according to one embodiment of the present invention. Communication system 100 includes communications server 110, local services network 120, packet network 124, aggregator 126, mobile communications carrier 128, and mobile communication devices 130a, 130b, and 130c. Communications server 110 may be used to support communication at a recreational venue such as a theme park or destination resort, for example. As shown in FIG. 1, communications server 110 is interactively linked to local services network 120, which may perform any of numerous information management functions within the recreational venue. For example, local services network 120 may provide updated information relevant to services and amenities available for enjoyment by visitors to the recreational venue. Also shown in FIG. 1 is group management application 112, residing on communications server 110.

According to the embodiment of FIG. 1, group management application 112 on communications server 110 is configured to support communications among mobile communication devices 130a, 130b, and 130c, and local services network 120. Mobile communication devices 130a, 130b, and 130c, respectively, correspond to devices operated by users (not shown in FIG. 1) who are guests visiting the recreational venue as members of a group. For example, a guest using mobile communication device 130a may identify him or herself as a member of a particular group recognized by group management application 112 by sending a short message service (SMS) text message containing a group identification code to communications server 110 via mobile communications carrier 128. As shown in FIG. 1, aggregator 126, which may be a short message service center (SMSC) for example, mediates communication between mobile communications carrier 128 and communications server 110.

In a similar manner, guests using mobile communication devices 130b and 130c may identify themselves as belonging to the group including the user of mobile communication device 130a. Subsequently, the users of mobile communication devices 130a, 130b, and 130c, can communicate with all other members of their group substantially simultaneously, in a number of different ways, as shall be described. For example, a user of mobile communication device 130a can send SMS text messages to communications server 110, for distribution by group management application 112 to mobile communication devices 130b and 130c. In addition, the members of the group can utilize group management application 112 to obtain information from local services network 120, as well as to receive communications relevant to the group from a group administrator, such as hotel a manager, or event coordinator, for example.

Figure 2:
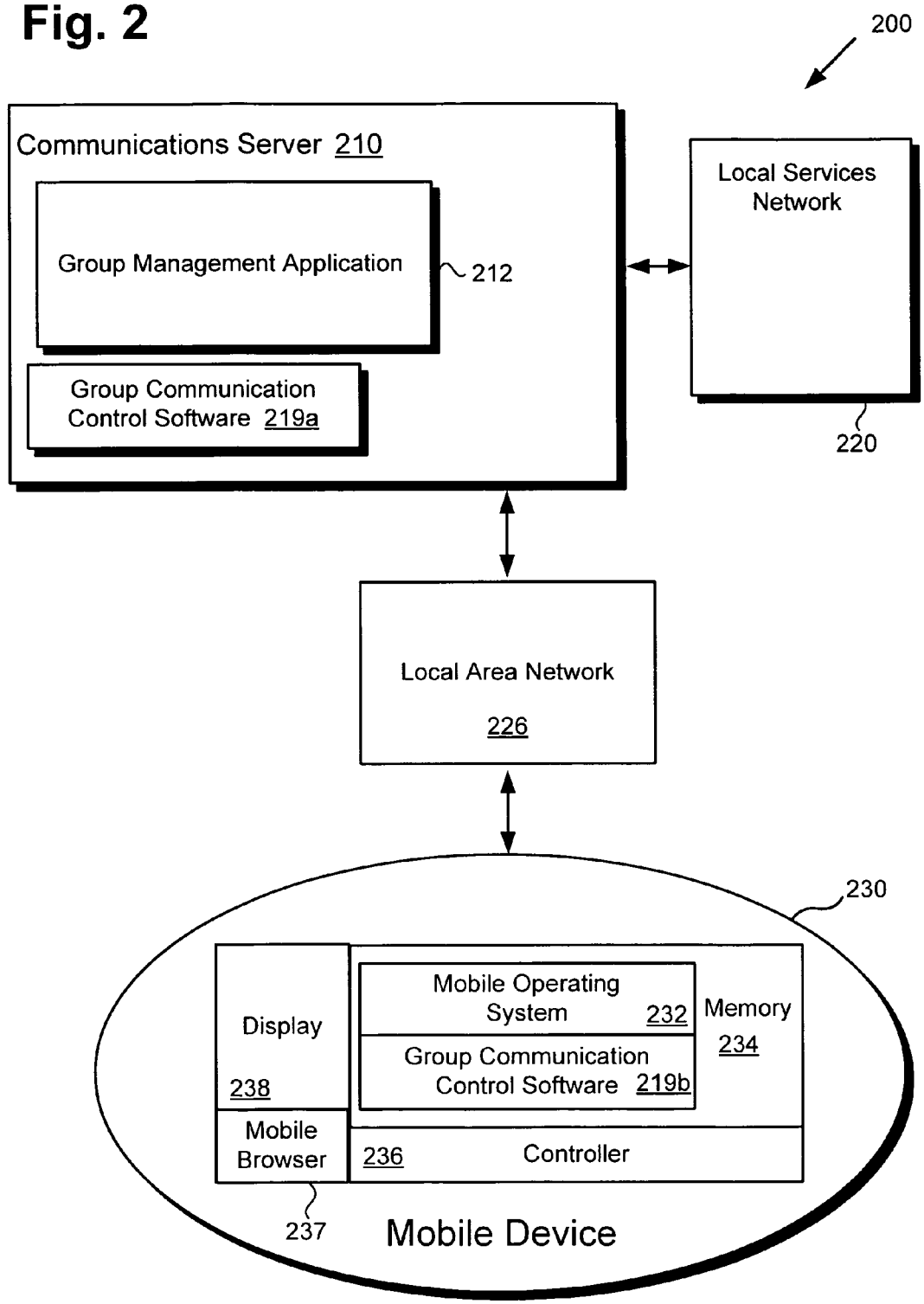
FIG. 2 is a block diagram of a system for managing group communications, according to another embodiment of the present invention.

Turning to FIG. 2, FIG. 2 is a block diagram of communication system 200 for managing group communications, according to another embodiment of the present invention. Communication system 200 comprises communications server 210, local services network 220, and mobile communication device 230, corresponding respectively to communications server 110, local services network 120, and any of mobile communication devices 130a, 130b, and 130c, in FIG. 1. Also shown in FIG. 2 is group management application 212, corresponding group management application 112, in FIG. 1. In addition, in FIG. 2, communications server 210 includes group communication control software 219a, having no analogue in FIG. 1.

As shown in FIG. 2, mobile communication device 230 is in communication with communications server 210 through local area network (LAN) 226, which may be supported by the recreational venue hosting communications server 210, for example. Mobile communication device 230 includes mobile operating system 232 located in memory 234, controller 236, mobile browser 237, and display 238. Also present in memory 234 of mobile communication device 230, is group communication control software 219b, corresponding to group communication control software 219a, on communications server 210. Mobile communication device 230 may be any device capable of supporting wireless data band communication, such as a suitably configured mobile telephone, personal digital assistant (PDA), digital media player, wireless computer, or wireless gaming console, for example.

According to the present embodiment, group communication control software 219b is located in memory 234, having been received from communications server 210 via LAN 226. LAN 226 may comprise a wireless network such as a Wi-Fi, Worldwide Interoperability for Microwave Access (WiMAX), or Bluetooth network, for example. Although in the present embodiment, transfer of group communication control software 219a is shown to result from data transfer over LAN 226, in another embodiment communication control software 219a may be downloaded over a packet network, such as the Internet, for example. In yet another embodiment, group communication control software 219a may be transferred via a wired or wireless connection to a client computer (not shown in FIG. 2). In that embodiment, the client computer serving as the intermediary transfer mechanism for transfer of group communication control software 219a may itself receive group communication software 219a as a download over a packet network, a transfer over LAN 226, or as an upload from a CD-ROM or other portable computer readable storage medium. Once transferred to mobile communication device 230, group communication control software 219b may be stored in memory 234 and run locally on mobile communication device 230.

Controller 236 may be the central processing unit for mobile communication device 230, for example, in which role controller 236 runs mobile operating system 232, launches mobile browser 237, and facilitates execution of group communication control software 219b. Web browser 237, under the control of controller 236, may be used to enable a user of mobile communication device 230 to view communications content distributed by group management application 212 running on communications server 210.

As was the case for communication system 100 in FIG. 1, in FIG. 2, communications server 210 is configured to manage communications among mobile communication device 230, mobile communication devices operated by other members of the group including mobile communication device 230, and local services network 220. In the implementation shown in FIG. 2, group communication control software 219*b* running on mobile communication device 230 enables the guest operating that device to access group management application 212. As a result, mobile communication device 230 may be utilized by a guest to engage in group communications with other members of his or her group, as well as access network information assets.

Figure 3A:
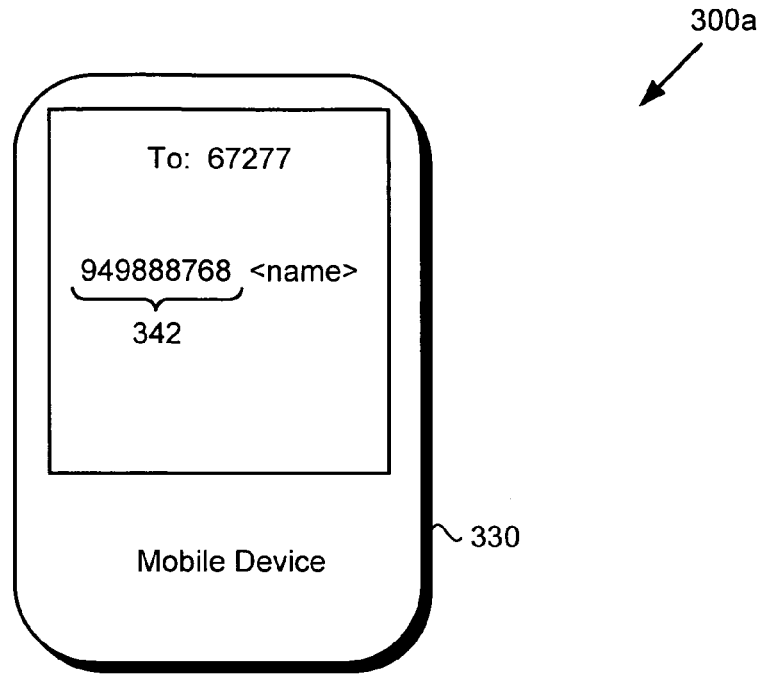
FIG. 3A shows a visual frame of a mobile communication device display corresponding to entry of a group identification code, according to one embodiment of the present invention.
Figure 3B:
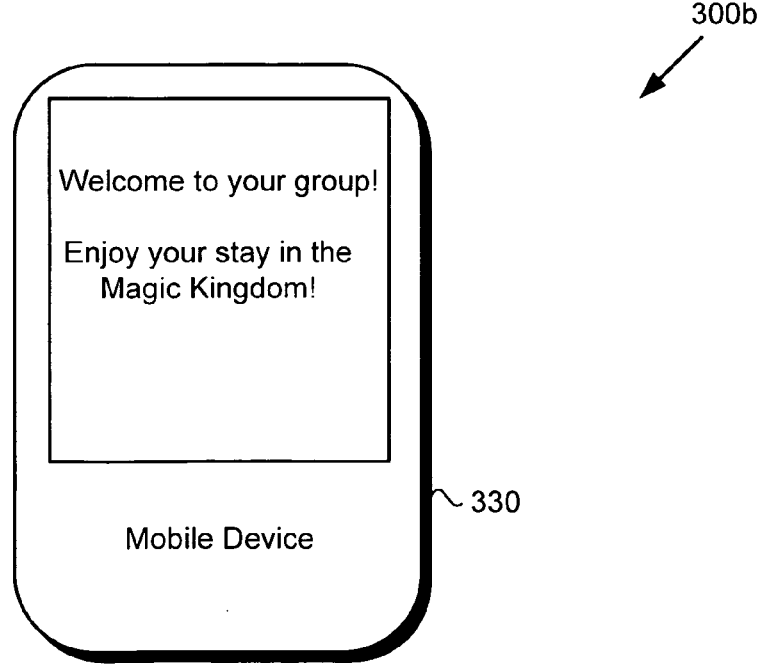
FIG. 3B shows a visual frame of a confirmation message sent by a communications server running a group management application, according to one embodiment of the present invention.

As has been previously mentioned, the communication systems shown in FIGS. 1 and 2 may be used to manage and facilitate communication among members of a group, during a joint visit to a theme park, destination resort, or other recreational venue. Those aspects of the present invention will now be further described by reference to FIGS. 3A, 3B, and 4, in addition to FIG. 1. FIG. 3A shows visual frame 300*a* of a mobile communication device display corresponding to entry of a group identification code, according to one embodiment of the present invention, while FIG. 3B shows exemplary visual frame 300*b* of a confirmation message sent by a communications server running a group management application. Mobile communication device 330 corresponds to any of mobile communication devices 130*a*, 130*b*, and 130*c*, in FIG. 1. It is noted that although for clarity of presentation, the following description focuses on the system shown FIG. 1, the system of FIG. 2 is fully capable of providing the described communication management.

Figure 4:
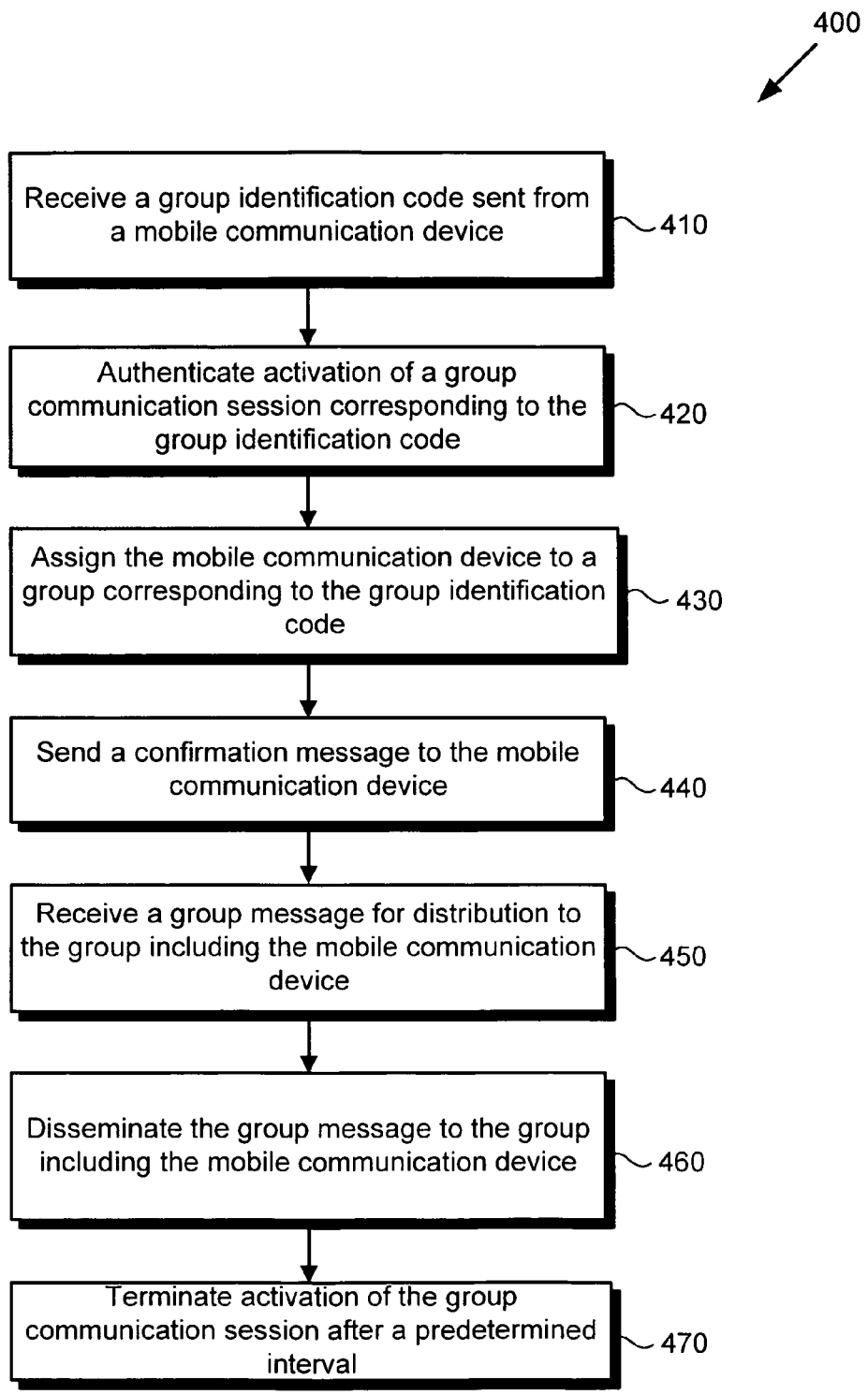
FIG. 4 is a flowchart presenting a method for managing group communications, according to one embodiment of the present invention.

FIG. 4 shows flowchart 400 describing the steps, according to one embodiment, of a method for managing group communications. Certain details and features have been left out of flowchart 400 that are apparent to a person of ordinary skill in the art. For example, a step may comprise one or more substeps or may involve specialized equipment or materials, as known in the art. While steps 410 through 470 indicated in flowchart 400 are sufficient to describe one embodiment of the present method, other embodiments may utilize steps different from those shown in flowchart 400, or may include more, or fewer steps.

Referring to step 410 of flowchart 400 in conjunction with FIGS. 1 and 3A, step 410 comprises receiving a group identification code sent from a mobile communication device. Step 410 corresponds, for example, to receipt at communications server 110, in FIG. 1, of a message like that shown in visual frame 300*a*, from mobile communication device 130*a*, 130*b*, or 130*c*. For illustrative purposes, let us focus on the exemplary scenario of a large group of business colleagues jointly attending a convention or similar function hosted by a facility associated with a theme park. For this example, let us further assume that mobile communication devices 130*a* and 130*b* are operated by members of the business group that are also commonly employed in a particular division of the business, such as the finance department, while mobile communication device 130*c* is operated by a member of the business group affiliated with the research and development (R&D) department.

After an early arrival at the convention facility, the users of mobile communication devices 130*a*, 130*b*, and 130*c*, decide to take advantage of an afternoon free of commitments to visit the theme park associated with their convention facility, which happens to be the recreational venue having group communications managed by communication system 100, in FIG. 1. Upon entry into the park, the members of the group may be provided with documentation explaining the features and operation of the available group communication system. The described documentation may include a group identification code uniquely assigned to the group comprising the users of mobile communication devices 130*a*, 130*b*, and 130*c*. The group identification code may take the form of a printed alphanumeric code, requiring manual entry in to mobile communication device 130*a*, 130*b*, and 130*c*, or a radio frequency identification (RFID) tag readable by those respective mobile communication devices, for example.

In one embodiment, a protocol for assigning group identification codes assures that sequential codes are not assigned to successive groups entering the park, in order to prevent one group from successfully guessing the group identification code assigned to another group. In another embodiment, a subset of group identification codes may be pre-assigned to a large group, such as the group comprising all guests registered for the convention attended by the users of mobile communication devices 130*a*, 130*b*, and 130*c*.

Having received and reviewed the documentation explaining group communication options in the park, those group members wishing to opt in to the group management service provided through communications server 110 by group management application 112, may do so by sending a specific text message to communications server 110. In one embodiment, shown in FIG. 3A, the opt in text message is sent to a number corresponding to group management application 112, i.e. 67277 in FIG. 3A. The contents of the text message include group identification code 342 and the name by which the user of mobile communication device 330 wishes to be known in the park. Such a message may be sent from mobile communication device 130*a*, in FIG. 1, and similar messages may be sent from mobile communication devices 130*b* and 130*c*, opting in to group management. Receipt of those respective opt in messages at communications server 110 occurs at step 410 of flowchart 400.

According to one embodiment, other guests of the theme park may be invited by the users of mobile communication devices 130*a*, 130*b*, and 130*c*, to join their group. For instance, after opting in to group management by sending the text message corresponding to step 410, a group member, such as the user of mobile communication device 130*a*, may utilize communications server 110 to deliver an invitation message to another mobile communication device user. An affirmative reply from the invitee who may not know the group identification code, may yet include the group identification code as embedded data. In that embodiment, group management application 112 may recognize the message as an invitation acceptance, and parse the message to receive the group identification code.

The exemplary method of flowchart 400 continues with step 420, which comprises authenticating activation of a group communication session corresponding to group identification code 342. Step 420 may be performed on communications server 110, for example, using group management application 112 and referring to a plurality of pre-authorized group identification codes available on communications server 110. Where a group identification code received in step 410 corresponds to a first instance of receipt of that particular code, authenticating activation may comprise confirming that group identification code 342 is a valid code, and initiating activation of the group communication session. Where, on the other hand, activation has already been initiated by a previously received message containing group identification code 342, authenticating activation in step 420 may comprise confirming that group identification code 342 is a valid code and that activation of a group communication session has occurred. In some embodiments, a group communication session is associated with a predetermined activation period, after which period the group communication session is terminated. In those embodiments, step 420 may additionally correspond to verification that the activation period for the group session has not expired.

Flowchart 400 continues with step 430, comprising assigning the mobile communication device to the group corresponding to group identification code 342. Having received the opt in messages in step 410, and having authenticated activation of a group communication session corresponding to group identification code 342 in step 420, group management application 112 may assign the mobile communication device from which the opt in message originated, to the group corresponding to group identification code 342. Although in the embodiment shown in FIG. 3A, a user provides a name identifying himself or herself as a member of the group, in one embodiment, group management application 112 parses a received opt in message to extract a mobile communication device identifier, such as a mobile telephone number, for example, and assigns that mobile communication device identifier to the group.

As a result of step 430, any of mobile communication devices 130a, 130b, and 130c, in FIG. 1, may be assigned to the group corresponding to group identification code 342. Step 430 may be followed by step 440, comprising sending a confirmation message to the mobile communication device. As shown in FIG. 3B, a confirmation message may comprise a simple welcome greeting and felicitation.

Moving now to step 450 of flowchart 400, step 450 comprises receiving a group message for distribution to the group including the mobile communication device. Continuing with the exemplary scenario of three business colleagues exploring a theme park, step 450 corresponds to any member of the group desiring to send a message to the other group members. For example, the user of mobile communication device 130a may have decided to enjoy a ride on a rollercoaster, while the users of mobile communication devices 130b and 130c pursue other activities independently of one another. At some subsequent time, one of those group members may wish to summon the others to a meeting at a specific location in-park. Such a message, sent from the mobile communication device of the group member initiating communication, could be sent as an SMS text message or email, depending on the communications capabilities of respective mobile communication devices 130a, 130b, and 130c, to the same number used to opt in to group management, i.e. 67277, in FIG. 3A. The contents of that message would comprise the message intended for distribution the other group members.

Let us consider, for example, a situation in which mobile communication devices 130a, 130b, and 130c, are basic mobile telephones lacking data band capability. In that case, an initiating mobile communication device, such as mobile communication device 130a, for instance, may send an SMS text message intended for the group via voice band. That message is typically routed by mobile communications carrier 128, for example a commercial carrier like Sprint or Verizon, to aggregator 126. Aggregator 126 may then transfer the message originating from mobile communication device 130a to communications server 110 via packet network 124, where it is received in step 450 of flowchart 400.

In one embodiment, mobile communication devices 130a, 130b, and 130c, may be assigned to more than one group identification code. For example, in addition to group identification code 342 corresponding to the group limited to mobile communication devices 130a, 130b, and 130c, those mobile communication devices may also be commonly assigned to a group spanning all other participants in the convention attended by the users of mobile communication devices 130a, 130b, and 130c. Alternatively, or in addition, the users of mobile communication devices 130a and 130b may be assigned to a group limited to members of the finance department, while the user of mobile communication device 130c may additionally belong to a group including members of the R&D department. In those embodiments, a group administrator other than a group member may originate a group message.

For example, a group administrator may have special access privileges to group management application 112, authorizing the group administrator to submit a message to communications server 110 for general distribution to all members of the specified group. A message updating the conventioneers regarding the time and location of the convention's welcome reception, for instance, may be submitted by a group administrator for substantially simultaneous distribution to all registered conference attendees. Submission of a group message by a group administrator may be by means of a mobile communication device, a packet network such as the internet, via a local area network (LAN) or other limited distribution network, through personal or voice interaction with a human operator of communications server 110, or by any other suitable means for communicating a message.

According to one embodiment, a group message may be received from elsewhere within communication system 100, as well. Such system messages may comprise timely venue specific information provided by local services network 120, for distribution to park guests on the basis of their known locations, for example. Alternatively, system messages may comprise important weather, news, or emergency alerts received by communications server 110 from sources internal to or external to the park, for distribution to park guests.

It is noted that although the present embodiment describes management of group messages in which the messages are SMS text messages, that representation is merely exemplary. In other embodiments, where mobile communication devices 130a, 130b, and 130c, are suitably configured, management of group messages by group management application 112 may extend to various message types including MMS, email, and other formats.

Following step 450, the group message may be processed by group management application 112 and disseminated to the group including the mobile communication device in step 460. It may be evident that when the originating mobile communication device is used by a member of the group, that user would not wish to receive his or her own originating message. Thus dissemination of the group message in step 460 is targeted to assigned mobile communication devices other than originating mobile communication device 130a. Where a message from a group administrator, or a system message has been received, the message is disseminated from communications server 110 to the appropriate subset of mobile communication devices assigned to that group.

Continuing with step 470 of flowchart 400, step 470 comprises expiring activation of the group communication session. As previously remarked, in some embodiments, the group session for which activation is authenticated in step 420 is associated with a predetermined activation period. For example, a group session flowing from entry into a theme park may be limited in time to an eighteen or twenty four hour window, at the end of which the group session is terminated. A predetermined activation period may be determined to enable group communication in-park, but be of a duration making it unlikely that users of mobile communication devices 130a, 130b, and 130c, will be able to continue group communication using the resources on communications server 110 after their group in-park experience has ended. Yet, in another embodiment, the predetermined activation period may be a subscription period that could extend to days, weeks, months, etc.

Thus, the system and method for managing group communications disclosed in the present application can simplify and enhance information exchange between the members of a group sharing a joint experience. By enabling guests of a recreational venue to opt in to a group session corresponding to their in-venue experience, the present disclosure describes an approach that advantageously facilitates dissemination of information across the members of the group. By providing a centralized group management application to receive, coordinate, and distribute group messages amongst group members, the present application discloses an approach that optimizes group communication while minimizing the costs of group communications to individual group members. Moreover, by supporting communications between the group and a local services network, the present solution advantageously provides access to timely logistical information, thereby enhancing the group experience.

From the above description it is manifest that various techniques can be used for implementing the present concepts without departing from their scope. Moreover, while the present application has provided a disclosure with specific reference to certain embodiments, a person of ordinary skills in the art would recognize that changes can be made in form and detail without departing from the spirit and the scope of the inventive concepts described. As such, the present embodiments are to be considered in all respects as illustrative and not restrictive. It should also be understood that other embodiments are not limited to the particular implementational details described herein, but are capable of many rearrangements, modifications, and substitutions without departing from the disclosed inventive concepts.

What is claimed is:

1. A system for managing group communications for groups of users visiting a recreational venue, the system comprising:
   a communications server accessible by a group of users having a plurality of mobile communication devices including a first mobile communication device and a second mobile communication device;
   a group management application resident on the communications server, the group management application configured to:
      receive a group identification code sent from a first mobile communication device;
      activate a group communication session corresponding to the group identification code;
      assign the first mobile communication device to the group of users corresponding to the group identification code in response to receiving the group identification code sent from the first mobile communication device;
      send a confirmation message to the first mobile communication device in response to receiving the group identification code sent from the first mobile communication device;
      receive the group identification code sent from a second mobile communication device;
      assign the second mobile communication device to the group of users corresponding to the group identification code in response to receiving the group identification code sent from the second mobile communication device;
      send a confirmation message to the second mobile communication device in response to receiving the group identification code sent from the second mobile communication device;
      receive a group message for distribution to the group of users;
      disseminate the group message to the plurality of mobile communication devices including the first mobile communication device and the second mobile communication device; and
      terminate the group communication session after a predetermined time interval;
      wherein sequential identification codes are not assigned to successive groups of the groups of users visiting the recreational venue, thereby preventing one to anticipate the group identification code assigned to the group of users.

2. The system of claim 1, wherein the group message is from a group administrator.

3. The system of claim 1, wherein the group management application is configured to support communications via short message service (SMS) text messaging.

4. The system of claim 1, wherein the group management application is configured to support communications via email.

5. The system of claim 1, further comprising a group communication control software capable of being downloaded to the first mobile communication device and the second mobile communication device; the group communication control software configured to enable communication among the communications server and the group of mobile communication devices including the first mobile communication device and the second mobile communication device over a local area network (LAN).

6. The system of claim 5, wherein the LAN comprises a Wi-Fi network.

7. The system of claim 5, wherein the LAN comprises a Worldwide Interoperability for Microwave Access (WiMAX) network.

8. The system of claim 1, wherein the system is implemented to manage group communications at the recreational venue corresponding to a local services network.

9. The system of claim 8, wherein the recreational venue comprises a theme park.

10. The system of claim 8, wherein the recreational venue comprises a destination resort.

11. A method for managing group communications for groups of users visiting a recreational venue, the method comprising:
   receiving a group identification code sent from a first mobile communication device;
   activating a group communication session corresponding to the group identification code;
   assigning the first mobile communication device to a group of users corresponding to the group identification code in response to the receiving of the group identification code sent from the first mobile communication device;
   sending a confirmation message to the first mobile communication device in response to the receiving of the group identification code sent from the first mobile communication device;
   receiving the group identification code sent from a second mobile communication device;

assigning the second mobile communication device to the group of users corresponding to the group identification code in response to the receiving of the group identification code sent from the second mobile communication device;

sending a confirmation message to the second mobile communication device in response to the receiving of the group identification code sent from the second mobile communication device;

receiving a group message for distribution to the group of users;

disseminating the group message to the plurality of mobile communication devices including the first mobile communication device and the second mobile communication device; and terminating the group communication session after a predetermined time interval;

wherein sequential identification codes are not assigned to successive groups of the groups of users visiting the recreational venue, thereby preventing one to anticipate the group identification code assigned to the group of users.

12. The method of claim 11, wherein the group message originates from a group administrator.

13. The method of claim 11, wherein the group message comprises a short message service (SMS) text message.

14. The method of claim 11, wherein the group message comprises an email message.

15. The method of claim 11, further comprising providing a group communication control software capable of being downloaded to the first mobile communication device; the group communication control software configured to enable communication among a communications server, a local services network, and the group over a local area network (LAN).

16. The method of claim 15, wherein the LAN is one of a Wi-Fi network, a Worldwide Interoperability for Microwave Access (WiMAX) network, and a Bluetooth network.

17. The method of claim 11, wherein the method is implemented to manage group communications at the recreational venue.

18. The method of claim 17, wherein the recreational venue comprises a theme park.

19. The method of claim 17, wherein the recreational venue comprises a destination resort.

20. A method for managing group communications for groups of users visiting a recreational venue, the method comprising:

receiving a group identification code sent from a first mobile communication device;

activating a group communication session corresponding to the group identification code;

assigning the first mobile communication device to a group of users corresponding to the group identification code in response to the receiving of the group identification code sent from the first mobile communication device;

sending a confirmation message to the first mobile communication device in response to the receiving of the group identification code sent from the first mobile communication device;

receiving the group identification code sent from a second mobile communication device;

assigning the second mobile communication device to the group of users corresponding to the group identification code in response to the receiving of the group identification code sent from the second mobile communication device;

sending a confirmation message to the second mobile communication device in response to the receiving of the group identification code sent from the second mobile communication device;

receiving a message from the first mobile communication device for distribution to at least one other user in the group of users;

disseminating the message to the at least one other use in the group of users by sending the message to at least the second mobile communication device; and terminating the group communication session after a predetermined time interval;

wherein sequential identification codes are not assigned to successive groups of the groups of users visiting the recreational venue, thereby preventing one to anticipate the group identification code assigned to the group of users.

* * * * *